United States Patent [19]

Drazba et al.

[11] Patent Number: 5,062,701
[45] Date of Patent: Nov. 5, 1991

[54] ASYMMETRIC CONTACT LENS

[75] Inventors: Martin J. Drazba, Arlington Heights; Michael L. Bellek, Lindenhurst; Samuel Dranoff, Buffalo Grove; Paul Hahn, Loves Park, all of Ill.

[73] Assignee: Wesley-Jessen Corporation, Chicago, Ill.

[21] Appl. No.: 614,356

[22] Filed: Nov. 16, 1990

Related U.S. Application Data

[63] Continuation-in-part of Ser. No. 203,381, Jun. 7, 1988, Pat. No. 4,976,533.

[51] Int. Cl.⁵ .......................... G02C 7/04; A61B 3/00
[52] U.S. Cl. ........................... 351/160 R; 351/160 H; 351/162; 351/177; 351/219
[58] Field of Search ............... 351/160 R, 160 H, 161, 351/162, 177, 219

[56] References Cited

U.S. PATENT DOCUMENTS

| | | | |
|---|---|---|---|
| 3,454,332 | 7/1969 | Siegel | 351/162 |
| 4,268,133 | 5/1981 | Fischer et al. | 351/161 |
| 4,309,085 | 1/1982 | Morrison | 351/39 |
| 4,525,044 | 6/1985 | Bauman | 351/160 H |
| 4,976,533 | 12/1990 | Hahn et al. | 351/160 R |

FOREIGN PATENT DOCUMENTS

| | | |
|---|---|---|
| 0042023 | 12/1981 | European Pat. Off. . |
| 1400566 | 4/1965 | France . |
| 1552106 | 11/1968 | France . |
| 2582416 | 11/1986 | France . |
| 1104718 | 2/1968 | United Kingdom . |

OTHER PUBLICATIONS

Durasoft-2 Optifit Toric ® Lens on Sale Since Sep. 1, 1988 and Descriptive Brochure Copyrighted 1988.

Primary Examiner—Scott J. Sugarman
Attorney, Agent, or Firm—Warrick E. Lee, Jr.

[57] ABSTRACT

A contact lens comprising a corneal section, a vertical axis, and a shape adapted to maintain the lens at an intended orientation. The lens has either a visible horizontal line segment located in the corneal section perpendicular to the vertical axis and/or three visible radial line segments in the corneal section, the first of the line segments located on the vertical axis, and the second and third segments located on either side of the first segment such that the extensions of the segments would pass through a geometric center of the corneal section forming two 20° angles. The lens is useful for measuring the rotation of an asymmetric lens. Methods for measuring lens rotation using the inventive lenses are also disclosed.

6 Claims, 6 Drawing Sheets

FIG. 7
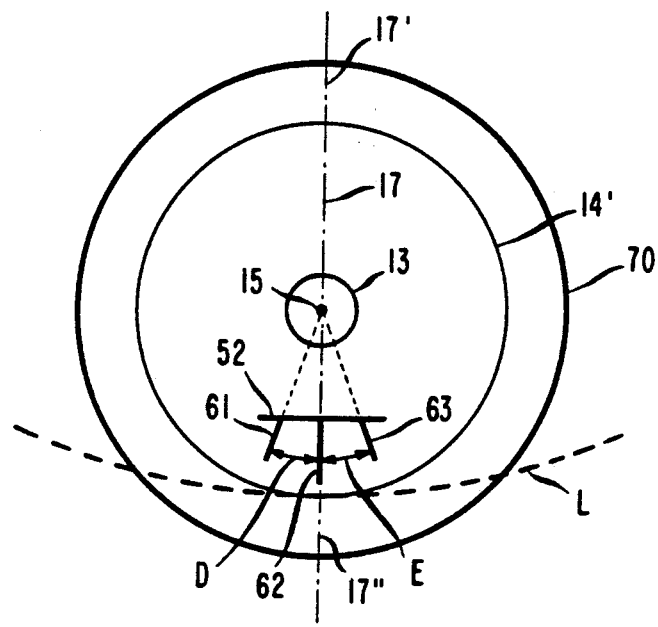
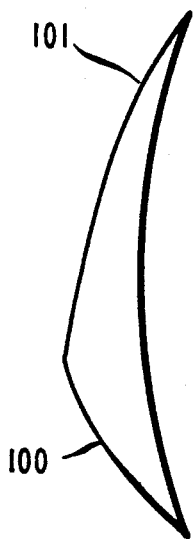
FIG. 8
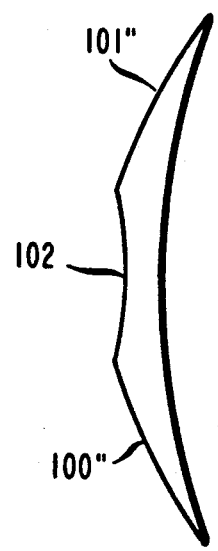
FIG. 9
FIG. 10

ASYMMETRIC CONTACT LENS

BACKGROUND OF THE INVENTION

This is a Continuation-In-Part of U.S. application Ser. No. 07/203,381, filed June 7, 1988, now U.S. Pat. No. 4,976,533.

Astigmatism is a defect in the eye that is corrected by a lens with an asymmetric prescription. The asymmetric prescription, which is usually expressed as cylinder on the patient's prescription order, causes at least a portion of the surface of the lens to have the shape of a toric segment. Hence, such lenses are called toric lenses. The asymmetric prescription must be correctly oriented with respect to the eye of the wearer. For ordinary eyeglasses, this presents no problem, because the lens is permanently fixed to the frame at the correct orientation, and the frame is non-rotatably attached to the wearer's face by the earpieces and nosepiece. For a toric contact lens, orientation is not so simple.

One method of maintaining correct orientation of the lens is to construct the lens with its intended bottom third thicker than its intended top two thirds. The blinking of the patient's eyelid tends to push the thicker intended bottom of the lens to the bottom of the eye. However, because of irregularities in the shape of the cornea, interference by the lower lid, etc., the intended bottom of the lens does not always settle at the exact bottom of the eye. Another way to maintain lens orientation is to construct the lens with a relatively thick central zone and thinner top and bottom zones. However, lenses of this type are also capable of settling to a position that is different from that intended. Very often a lens of either type settles to a position that is rotated 5 or more degrees from its intended position. This rotation must be measured and taken into account in the cylinder portion of the lens prescription.

DESCRIPTION OF THE DRAWINGS

Prior art methods of measuring lens rotation and the inventive methods are best described with reference with the accompanying drawings wherein:

FIG. 7 illustrates a preferred embodiment of the present invention wherein the features of FIGS. 5 and 6 are combined.

FIG. 8 illustrates schematically a cross-section of the lenses of FIGS. 1, 2, and 5 to 7 showing that these lenses are thicker at the bottom than at the top.

FIG. 9 illustrates a cross section of the lens of FIG. 3 showing its relatively thick central zone and thinner top and bottom zones.

FIG. 10 illustrates schematically a cross section of the lens of FIG. 4 showing that it is thicker at the bottom than at the top.

DESCRIPTION OF THE PRIOR ART

Figure 1:
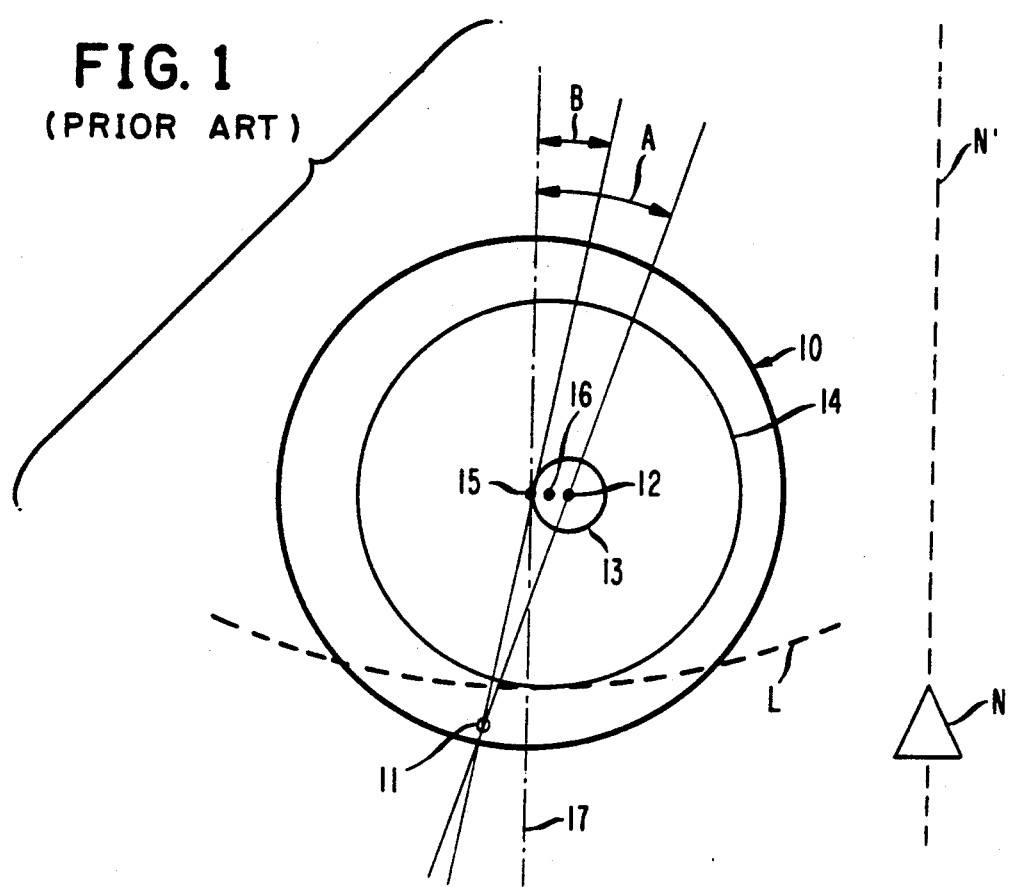
FIG. 1 illustrates a prior method of measuring rotation wherein the lens has a small evacuated circle (i.e. a dimple) at its intended bottom.
Figure 2:
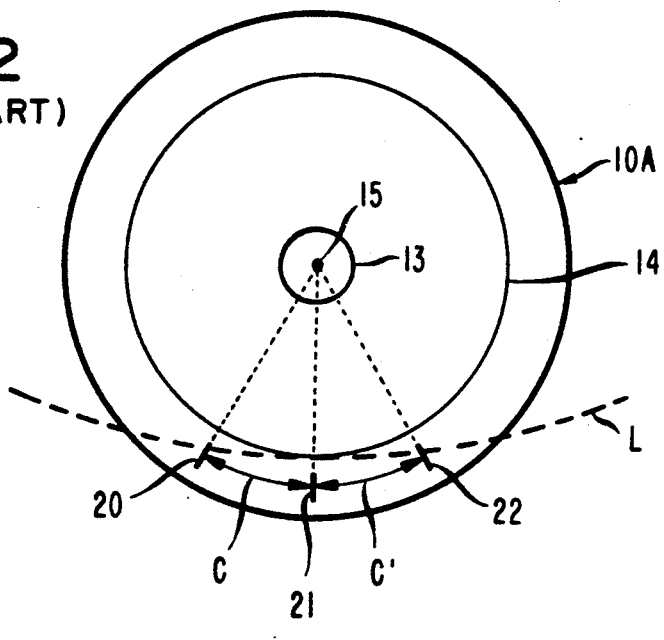
FIG. 2 illustrates another prior method wherein the lens has radial line segments at 30° angles to each other.
Figure 3:
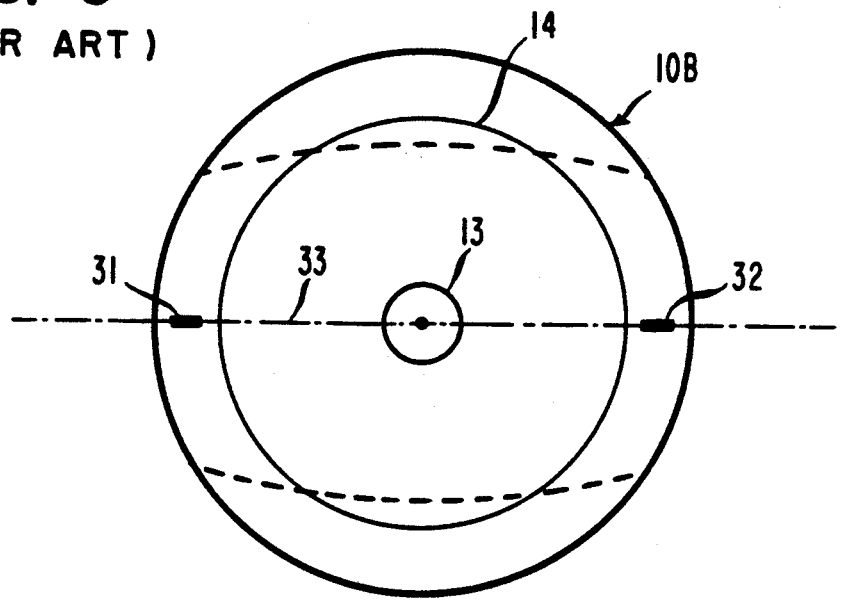
FIG. 3 illustrates yet another prior method wherein the lens has two horizontal bars on its "equator".

All of the lenses illustrated in FIGS. 1 to 4 (prior art) and 5 to 7 (the present inventions) are shaped to maintain a fixed rotational orientation when worn. The prior art lenses of FIGS. 1 and 2, and the inventive lenses of FIGS. 5 to 7 have cross sections as shown in FIG. 8. The lower third of these lenses is thicker than the top two thirds. Blinking of the wearer's upper lid pushes bottom 100 downward, while keeping top 101 near the top of the eye. The prior art lens of FIG. 3 is shown in cross section in FIG. 9. The center section 102 of this lens is thicker than the top 101" and bottom 100". The thicker zone of the lens of FIG. 3 is located between the dotted lines in FIG. 3. FIG. 10 is a cross-sectional view of the prior art lens of FIG. 4. This cross section is the same as FIG. 8, except that a small portion of the lens bottom, shown dotted, has been removed.

The exact shaping of the inventive lenses is not a part of this invention. Although the cross section of FIG. 8 is preferred, any equivalent shaping intended to maintain rotational orientation will suffice.

In FIG. 1, lens 10 has a small visible circle 11 located at its intended bottom. The circle is drilled part way through the lens and is easy to see in the bright light of a slit lamp. To measure rotation of the lens of FIG. 1, the eyecare practitioner places a trial lens on the eye of the wearer and, with a slit lamp, projects a narrow beam of light across the center 12 of the patient's pupil 13 and dot 11. The angle formed by the narrow light beam and the vertical 17 is considered to be the rotation of the lens. However, this method of measuring rotation has several disadvantages:

1) The beam of the slit lamp must pass through the center of the pupil into the eye of the patient. Most patients find this very uncomfortable since it can be equivalent to looking into the continuous flash of a camera for 10 to 15 seconds.

2) Not all pupils are centered within the cornea. In FIG. 1 the center 12 of pupil 13 is shown located to the right of the geometrical center 16 of cornea 14. In anatomical terms the pupil's center 12 is said to be located nasally (i.e. toward axis N, of nose N) from the cornea's geometrical center 16. Furthermore, most often a contact lens settles to a position wherein its center is not located on the geometrical center of the cornea. Instead, the lens' center settles to a position that is over the apex of the cornea. In FIG. 1, the center 15 of lens 10 is located to the left of the geometric center 16 of cornea 14. In anatomical terms the lens' center and corneal apex 15 is said to be located temporally (i.e. away for axis N' of nose N) from the cornea's geometrical center 16. This is the usual centering position of both soft and hard contact lenses. Such off-center locations can cause errors in the measurement of lens rotation. In FIG. 1, the angle formed by the slit-lamp beam passing through the center 12 of the pupil and small circle 11 and the vertical 17 is angle A. Using the lens of FIG. 1 to measure rotation would cause the practitioner to use the angle A as the amount of lens rotation. However, the angle formed by a line passing through the true center 15 of the lens and circle 11 and the vertical 17 is only angle B. Hence use of the method of FIG. 1 would cause the practitioner to use angle A as the amount of rotation when angle B is the actual rotation. It is believed that errors of up to about 15° can occur when using the lens of FIG. 1.

3) The prior art lenses of FIG. 1 are hydrophilic lenses, which are larger than the cornea, and small circle 11 is located below cornea 14 under the normal position L of the lower eyelid as show in FIG. 1. When the lens is on the patient's eye, the circle is covered by the lower lid and the practitioner must pull the lower lid away when making the measurement. This can cause the lens to rotate from its normal position with the lower lid in place.

4) If the practitioner does not have a slit lamp, there is no way to estimate the rotation with any kind of accuracy.

5) Deposits of protein can accumulate in small circle 11.

6) Although small circle 11 is easy for the practitioner to see with the benefit of a slit lamp, it is difficult for the patient to see when inserting the lenses in normal lighting. Hence the patient might insert the lens upside-down or sideways. A lens so inserted might not assume its intended orientation despite its shaping.

A second prior method for measuring lens rotation is shown in FIG. 2. Here lens 10A has three line segments 20, 21 and 22, the extensions of which would pass through center 15 of the lens. Segments 20, 21 and 22 are located such that the angles C and C' formed by the extensions of segments 20 and 21 and of segments 21 and 22 are 30°. The line segments are etched into the lens with a laser.

To measure rotation with the lens of FIG. 2, the practitioner uses a slit lamp to form a narrow beam of light from the center of pupil 13 to middle segment 21. The angle formed by this beam and the vertical is used as the amount of rotation. Alternatively, if the practitioner does not have a slit lamp, the practitioner can estimate the amount of rotation based on his knowledge that the segment are 30° apart.

However, practice of the method of FIG. 2 has several disadvantages:

1) The slit lamp beam must pass through the pupil, causing discomfort, as with the method of FIG. 1.

2) Decentralization of the pupil with respect to the center of the cornea, or of the lens with respect to the center of the cornea, or both can cause the measurement to be inaccurate as with the method of FIG. 1.

3) The line segments are located below the cornea 14, under the normal position L of the lower lid, so that it is necessary to pull away the lower lid when making the measurement. This can also cause inaccuracy as with the method of FIG. 1.

4) When estimating the rotation without a slit lamp, it is easy to estimate rotation of 15° or 30°, but difficult to estimate rotations of 5°, 10°, 20° or 25°. That is, the 30° spacing of the line segments is not optimum.

5) Deposits can accumulate on the etched lines 20, 21 and 22.

6) The etched lines are difficult for the patient to see, which can cause upside-down or sideways insertion, as with the lens of FIG. 1.

FIG. 3 illustrates a third prior method for measuring rotation. Lens 10B of FIG. 3 has two horizontal line segments 31 and 32 located on a horizontal equator 33 of the lens. Line segments 31 and are very lightly etched onto the lens.

To measure rotation with the lens of FIG. 3, the practitioner focuses the beam of a slit lamp along line segments 31 and 32. The beam also enters the patient's eye through pupil (13). The angle formed by the beam and the horizontal is the amount of lens rotation.

The method of FIG. 3 has several disadvantages:

1) The slit lamp beam must pass through the as with the method using the lens of FIG. 1.

2) Because segments 31 and 32 are lightly etched, they are very difficult to see, even with a slit lamp.

3) There is no way to accurately estimate rotation when a slit lamp is unavailable.

4) Deposits may accumulate on the etched line segments.

5) The lens may flex when on the eye causing line segments 31 and 32 to move off the equator of the lens. Such flexing can give a false measurement of the lens's rotation.

6) It is difficult for the wearer to tell the bottom from the top of the lens, possibly causing upside-down or sideways placement on the eye.

Figure 4:
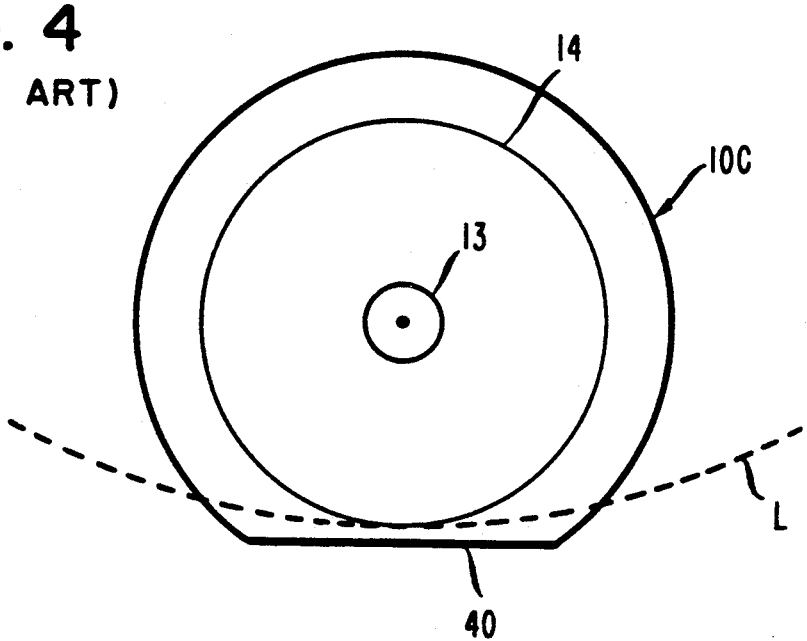
FIG. 4 illustrates still another prior method wherein the lens has a bottom truncation, i.e. its lower portion is removed.

FIG. 4 shows a fourth prior method for measuring lens rotation. Here, the lens 10C is truncated so that it has a flat, or nearly flat bottom 40.

To practice the method of FIG. 4., the practitioner focuses a slit lamp beam along truncation 40. The angle formed by the beam and the horizontal is the amount of rotation.

This method also has some disadvantages:

1) The lower lid L has to be pulled away to make the measurement, which can cause the rotation to change from its normal position with the lower lid in place, as with the lens of FIG. 1.

2) This is no way to estimate rotation without a slit lamp.

3) Truncated lenses are perceived to be uncomfortable by many patients.

SUMMARY OF THE INVENTION

A first aspect of the invention may be summarized as follows:

a contact lens comprising:

A. a cornea section intended to cover the cornea of the wearer;

B. a vertical axis having a top intended to be located at the top of the wearer's eye and bottom intended to be located at the bottom of the wearer's eye;

C. a shape adapted to maintain said lens at its intended orientation within the eye;

D. a visible horizontal line segment located within said corneal section perpendicular to said vertical axis; and E. an asymmetric prescription located over at least a portion of said corneal section.

In a second aspect of the invention the lens has three visible radial line segments located in said corneal section, the first of said radial line segments located on said vertical axis and the second and third of said radial line segments located on either side of said first radial line segment, said radial line segments located such that their extensions would pass through a geometrical center of said cornea section forming two 20° angles.

In a third aspect of the invention the lens has:

(a) a visible horizontal line segment located within said corneal section, perpendicular to said vertical axis; and (b) three visible radial line segments located in said corneal section, the radial line segments or their extensions intersecting said visible horizontal line segment or its extensions, the first of said radial line segments located on said vertical axis and the second and third of said radial line segments located on either side of said first radial line segment, said radial line segments located such that their extensions would pass through a geometrical center of said corneal section forming 20° angles.

In preferred embodiments of the invention the line segments are pigmented and/or the lens is a hydrophilic lens further comprising a scleral section surrounding the corneal section and/or the lens further comprises an asymmetric prescription located over at least a position of said corneal section. The pigmented lines make it very easy for the patient to distinguish the bottom of the lens from the top, thereby substantially eliminating upside-down insertion.

The invention also comprises methods for measuring rotation using the inventive lenses.

DETAILED DESCRIPTION OF THE INVENTION

Figure 5:
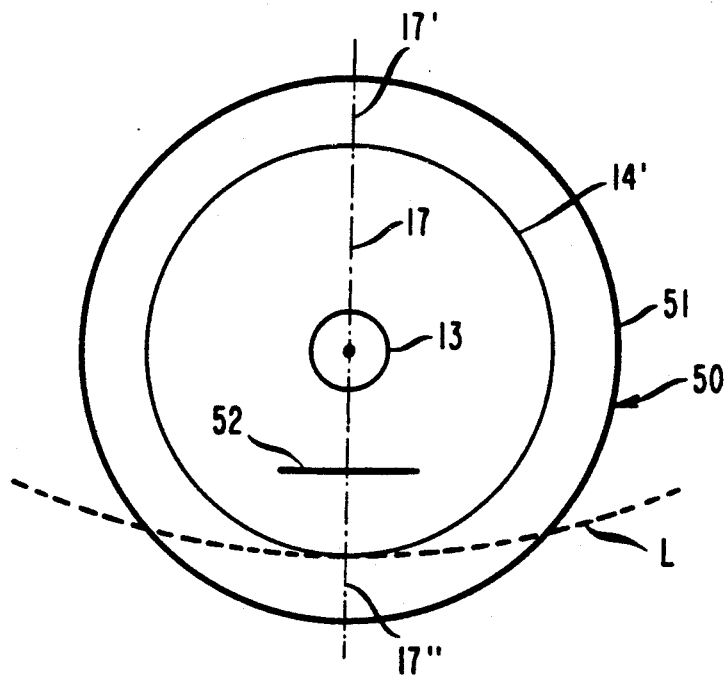
FIG. 5 illustrates an embodiment of the present invention wherein the lens has a horizontal line segment located between its center and bottom.

A first aspect of the present invention is illustrated in FIG. 5. Lens 50 has the usual elements of conventional asymmetric contact lenses. A corneal section 14, is intended to cover the wearer's cornea when the lens is worn. Within corneal section 14, there is a pupil section intended to cover the patient's pupil 13. If the lens is hydrophilic, it will have an outer or scleral section 51 surrounding corneal section 14, An imaginary vertical axis 17 has a top 17, which is intended to be located at the top of the wearer's eye and a bottom 17" intended to be located at the bottom of the wearer's eye. The lens has a shape adapted to maintain the lens at its intended orientation. Preferably the bottom of the lens is relatively thicker than the top, as shown schematically in FIG. 8 to maintain the lens at its intended orientation, i.e. with the top 17, of axis 17 at the top of the eye and the bottom 17" of axis 17 at the bottom of the eye. Of course other shapes adapted to maintain the lens at its intended orientation, such as those illustrated in FIGS. 3 and 9, and FIGS. 4 and 10 may also be used.

In order to measure the rotation of lens 50 when it is on the eye of the intended wearer, visible horizontal line segment 52 is provided. The rotation of the lens is the angle formed between vertical axis 17 and the true vertical axis of the wearer's eye, not shown. When the practitioner measures rotation using the lens of FIG. 5, as described later, he actually measures the angle formed by line segment 52 and the true horizontal, which is the same as the rotation described in the previous sentence. Line segment 52 is located within corneal section 14', perpendicular to vertical axis 17 such that line segment 52 and its extensions are outside of the lens's pupil section. Preferably segment 52 is below the patient's pupil 13, as shown in the drawing.

For greater visibility it is preferred that line segment 52 be pigmented, i.e. be formed of an ink, paint, or other material containing pigment. Methods for depositing a pigmented marking on the surface of a lens are disclosed in Loshaek's U.S. Pat. No. 4,668,240. Briefly, in a preferred method, a contact lens constructed of polymer having functional groups selected from at least one of —COOH, —OH AND —NH—R, wherein R is hydrogen or $C_1$ to $C_8$ alkyl is provided. Conventional hydrophilic lenses constructed at least partially of poly(hydroxyethyl methacrylate), which have the functional groups —OH, may, for example, be used. An ink comprising pigment, binding polymer having functional groups selected from —COOH, —OH or —NH—R and an additional compound having at least two groups per molecule of —NCO or epoxy, is prepared. Horizontal line 52 is stamped on the lens using the ink and the ink is cured, e.g. by heat. Of course, other methods of placing line segment 52 on the lens are possible, e.g. by cutting the line segment into the lens with a laser or by lightly abrasive etching. However, such cut lines are not as easy to see as pigmented lines. Furthermore, cut or etched line segments have the potential to attract deposits; hence pigmented line segments are highly preferred. In addition to line segment 52, this paragraph applies to all other visible line segments of this invention.

To use the lens of FIG. 5 for measuring rotation, the practitioner disposes the lens on the eye of the patient and, with the patient's head in a vertical position, projects a narrow beam of light onto segment 52. The angle formed by the light beam and the true horizontal of the patient's eye is the amount of rotation of the lens.

After the measurement is taken, a lens having the same diameter and rear curve as lens 52 is provided and the patient's asymmetric prescription is lathe cut, molded, or spun cast into the lens, taking into account the amount of rotation. This new lens also has segment 52 on it so that:

(1) The practitioner can measure the rotation of the new lens on the patient's eye, and (2) The patient can use segment 52 to avoid inserting the lens upside down or sideways. This is desirable because a lens inserted upside down or sideways might not right itself, resulting in less than optimum vision.

A more accurate measurement of the rotation of the lens actually prescribed for the patient can be achieved, if the lens used to initially measure rotation contains a prescription that is approximately equal to that of the patient's prescription. Hence, the lens used to initially measure rotation will preferably have an asymmetric prescription located over at least a portion of its corneal section. Of course, the lens that is finally dispensed to the patient also has such a prescription.

Use of the lens of FIG. 5 to measure rotation has several advantages over use of prior art lenses:

1. Patient discomfort is avoided because the slit lamp does not have to pass through the patient's pupil. Use of the prior art lenses of FIGS. 1, 2 and 3 does not have this advantage.

2. The pupil's center is not used as a reference point. Hence, the inaccuracies possible when using the lenses of FIGS. 1 and 2 are avoided.

3. The lower lid of the patient's eye does not have to be pulled away to measure the rotation. Hence, the inaccuracies possible when using the lenses of FIGS. 1, 2 and 4 are avoided.

4. If line segment 52 is pigmented, there will be no depressions in the lens to collect deposits, as with the lenses of FIGS. 1 to 3.

5. If line segment 52 is pigmented, it will be easier to see than the etched or drilled indicia of FIGS. 1 to 3.

6. There need be no truncation perceived to be uncomfortable by many.

7. Lens flexure effects will not affect the measurement accuracy, as with the lens of FIG. 3.

Figure 6:
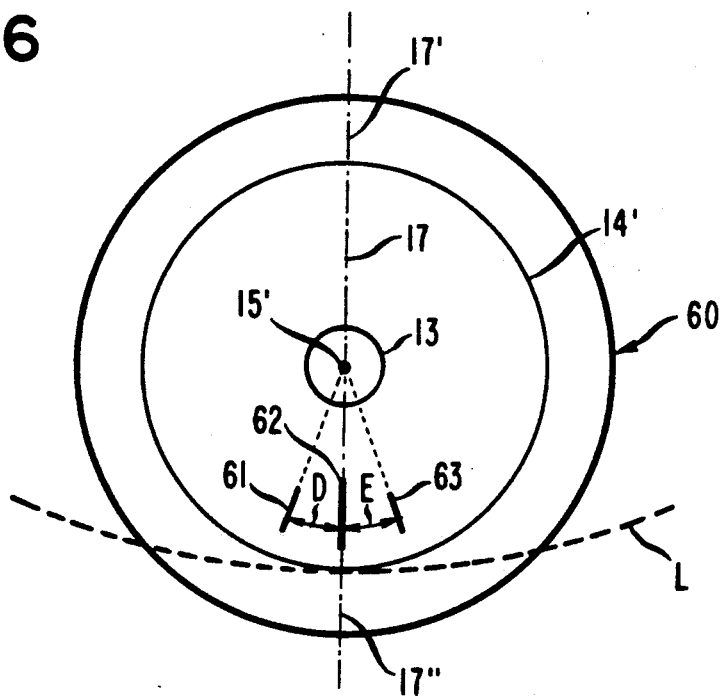
FIG. 6 illustrates another embodiment of the present invention wherein the lens has radial line segments at 20° angles to each other.

A second aspect of the invention is illustrated in FIG. 6. The lens 60 has the usual aspects of prior art lenses, i.e. corneal section 14', vertical axis 17, and a shape intended to maintain the lens's orientation. As with prior art methods, the lens may have an asymmetric prescription over at least the patient's pupil 13.

For measuring rotation, the lens has three visible radial line segments 61, 62 and 63 located in corneal section 14'. Line segments 61, 62 and 63 are preferably pigmented. A first radial line segment 62 is located on vertical axis 17. Second and third radial line segments 61 and 63 are located on either side of first line segment 62 such that their extensions, shown dotted, would pass through geometrical center 15' of corneal section 14' forming two 20° angles D and E.

To use the lens of FIG. 6 to measure rotation, the practitioner focuses a slit lamp beam over segment 62 and the center 15' of the pupil 13 and uses the angle formed by the beam and the true vertical as the measure of rotation. Using the lens of FIG. 6 to measure rotation has some of the disadvantage of using the lens of FIG. 2 in that the slit lamp's beam must pass through the patient's pupil and decentralization of the pupil or lens can introduce inaccuracies. However, the potential inaccuracy introduced by pulling the lower lid away is avoided because the line segments are located on the corneal section of the lens. Furthermore, use of pigmented line segments renders them easier to see.

Without a slit lamp, the practitioner may use his knowledge that the segments are 20° apart to estimate the rotation. Use of the lens of FIG. 6 to estimate rotation without slit lamp has advantages over use of the lens of FIG. 2 in that:

(a) the lower lid need not be pulled away to see the line segments, and (b) the 20° spacing of the radial line segments makes it very easy to estimate rotations of 5°, 10°, 15° and 20°, and by extrapolation, rotations of 25° and 30°.

The preferred embodiment of the inVention is illustrated in FIG. 7. Lens 70 has the same conventional features as the lenses of FIGS. 5 and 6, i.e., corneal section 14', vertical axis 17, shape for maintaining orientation, and an optional asymmetric prescription over at least the patient's pupil 13.

For measuring rotation lens 70 has a combination of the features of lenses 50 and 60 of FIGS. 5 and 6 respectively. A visible, preferably pigmented, horizontal line segment 52 is located within corneal section 14', perpendicular to vertical axis 17. Three visible, preferably pigmented, radial line segments 61, 62 and 63 are also located in the corneal section. Radial line segments 61, 62 and 63 or their extensions intersect horizontal segment 52. In the embodiment of FIG. 7, radial segments 61, 62 and 63 terminate at horizontal segment 52. First radial segment 62 is located on vertical axis 17, and second and third radial segments 61 and 63 are located on either side of first segment 62. Extensions of line segments 61, 62 and 63, shown dotted, would pass through the geometrical center 15 of corneal section 14' forming two 20° angles D and E.

To use the lens of FIG. 7 for measuring rotation, the practitioner projects a narrow beam of light from a slit lamp across horizontal segment 52 and uses the angle formed by the narrow beam and the true horizontal as the measure of rotation. This method of measuring rotation has all the advantages of use of the lens of FIG. 5. To measure rotation without a slit lamp, the practitioner compares positions of radial line segments 61, 62 and 63 with the true vertical. This method has all of the advantages of using the radial line segments of FIG. 6 for measuring rotation without a slit lamp.

Figure 11:
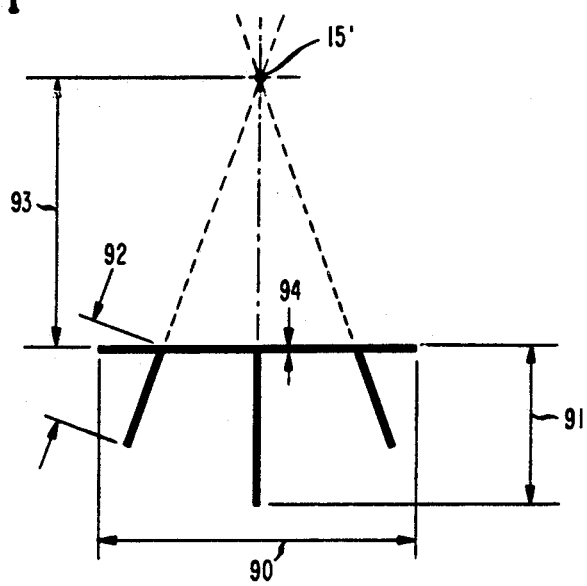
FIG. 11 illustrates the dimensions of the line segments in accordance with the invention.

FIG. 11 illustrates the preferred dimensions for visible line segments in accordance with the invention, which are as follows:

90—length of horizontal line segment, preferably from 1.5 to 5 mm, more preferably about 4.5 mm;

91—length of center radial line segment, preferably from 0.5 to 3.5 mm, more preferably about 1.4 mm;

92—length of outside radial line segments, preferably from 0.3 to 3.0 mm, more preferably about 1 mm;

93—distance from geometric center of lens 15' to horizontal line segment, preferably from 0 to 6 mm, more preferably from 3.5 to 6 mm, and most preferably about 4.2 mm.

94—thickness of all line segments, if pigmented, preferably about 0.01 to 1.0 mm, more preferably about 0.3 mm. If the more preferred thickness is used, the line segments will be easy for the practitioner and patient to see at close distances, but not easy to see at ordinary viewing distances when the lens is worn. For hydrophilic lenses, these measurements apply to the lens in the hydrated state.

Distance 93 will normally be greater than zero. However, even if the horizontal line segment is on geometric center 15', i.e., even if distance 93 is zero, the lens still can be used for measuring rotation in test lenses.

Figure 19:
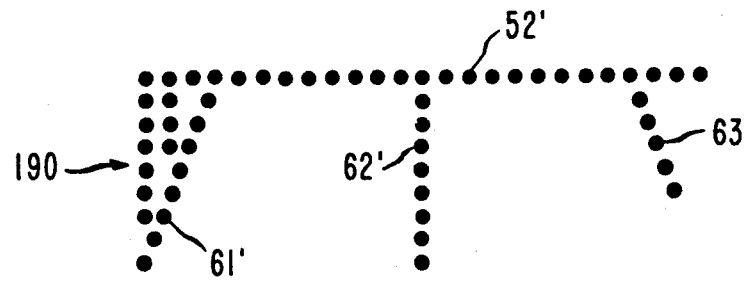
Figure 20:
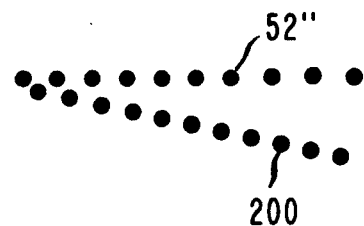
Figure 21:
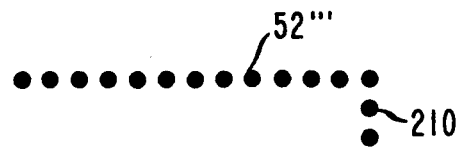

In a preferred embodiment the above dimensions are used, but the line segments are dotted, as shown in FIGS. 19, 20, and 21.

Figure 12:
FIGS. 12 to 21 illustrates alternative embodiments of the present invention.

FIGS. 12 to 17 illustrate some alternative embodiments of the invention of FIG. 7. In FIG. 12 the horizontal segment does not extend beyond the radial line segments.

Figure 13:
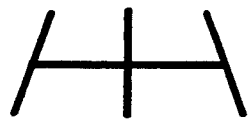

In FIG. 13 the radial line segments cross the horizontal line segment, which does not extend beyond the radial line segments.

Figure 14:
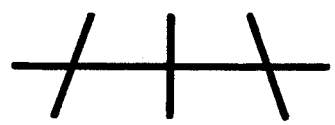

In FIG. 14 the radial line segments cross the horizontal line segment, which extends beyond the radial line segments.

Figure 15:
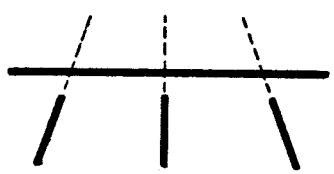

In FIG. 15, only the extension (shown dotted) of the radial line segments intersect the horizontal line segment.

Figure 16:
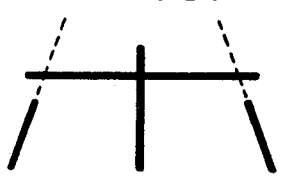

In FIG. 16 the center radial segment crosses the horizontal segment, while only the extensions of the outer line segments intersect the horizontal segment.

Figure 17:
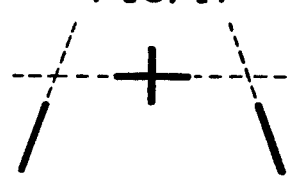

In FIG. 17 only the extensions of the horizontal line segment intersect only the extensions of the outer radial segments. The center radial segment crosses the horizontal segment.

Figure 18:
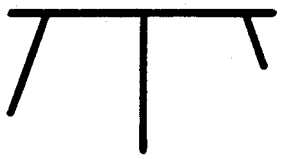

In FIG. 18 one of the outside radial line segments, i.e., one of the segments that is not located on the vertical axis, is shorter than the other outside line segment. This allows the patient to determine when the lens has been inadvertantly turned inside out. For example, if the patient knows that the short line segment belongs on the right hand side of the lens, if the short segment is on the left hand side, the patient will know that the lens is inside out.

In general, any lens marking that is asymmetric about the vertical axis may be used to determine whether a lens is inside out. Use of asymmetric markings has been disclosed in U.S. Pat. No. 4,525,044 (Bauman), but not in combination with the lens markings of this invention.

FIG. 19 illustrates an alternative embodiment of the invention wherein horizontal line segment 52' is formed by a series of dots arranged in a horizontal line. Line segments 61', 62', and 63' are also formed by dots. Extra marking, dots 190, fill the angle formed by line segments 61' and 52' so that the marking, as a whole is asymmetric about the vertical axis.

FIG. 20 illustrates yet another alternative embodiment of the invention. Here the mark on the lens has a horizontal line segment 52", formed of dots, and additional marking 200 in the form of a slanted line segment to cause the mark to be asymmetric about the vertical axis.

FIG. 21 illustrates still another alternative embodiment of the invention wherein horizontal line segment 52", formed of dots, has additional marking 210 in the form of extra dots to cause the mark to be asymmetric about the vertical axis.

Of course other alternative embodiments in accordance with the appended claims are operable.

It can be seen that the present invention provides a method and lenses for measuring the rotation of a lens that, in its preferred embodiments, overcomes all of the disadvantages of the prior art.

What is claimed is:

1. A contact lens comprising: pl A. a corneal section intended to cover the cornea of the wearer;
  B. a pupil section within said corneal section intended to cover the pupil of the wearer;
  C. a vertical axis having a top intended to be located at the top of the wearer's eye and bottom intended to be located at the bottom of the wearer's eye;
  D. a shape adapted to maintain said lens at its intended orientation within the eye;
  E. a visible horizontal line segment located within said corneal section perpendicular to said vertical axis, said line segment and its extensions being outside of said pupil section;
  F. an asymmetric prescription located over at least a portion of said corneal section, and
  G. extra marking to cause the combination of said line segment and extra marking to be asymmetric about said vertical axis.

2. The lens of claim 1 wherein said line segments are formed of dots.

3. A contact lens comprising:
  A. a corneal section intended to cover the cornea of the wearer;
  B. a vertical axis having a top intended to be located at the top of the wearer's eye and bottom intended to be located at the bottom of the wearer's eye;
  C. a shape adapted to maintain said lens at its intended orientation within the eye;
  D. a visible horizontal line segment located within said corneal section perpendicular to said vertical axis;
  E. three visible radial line segments located in said corneal section, the radial line segments or their extensions intersecting said visible horizontal line segment or its extensions, the first of said radial line segments located on said vertical axis and the second and third of said radial line segments located on either side of said first radial line segment, said radial line segments located such that their extensions would pass through a geometrical center of said corneal section forming 20° angles, and
  F. extra marking to cause the combination of said horizontal line segment, said radial line segments and said extra marking to be asymmetric about the verticle axis.

4. The lens of claim 2 wherein said extra marking is located within an angle formed by an intersection of said horizontal line segment and one of said line segments located on a side of said vertical axis.

5. The lens of claim 3 wherein said line segments are formed of dots.

6. The lens of claim 4 wherein said line segments are formed of dots.

* * * * *